(12) United States Patent
Cai (10) Patent No.: US 10,403,108 B2
(45) Date of Patent: Sep. 3, 2019

(54) IMAGING AND LIGHTING DEVICE AND SURVEILLANCE AND LIGHTING SYSTEM HAVING SAME

(71) Applicant: Xing Mike Cai, Duluth, GA (US)

(72) Inventor: Xing Mike Cai, Duluth, GA (US)

(*) Notice: Subject to any disclaimer, the term of this patent is extended or adjusted under 35 U.S.C. 154(b) by 0 days.

(21) Appl. No.: 15/730,914

(22) Filed: Oct. 12, 2017

(65) Prior Publication Data

US 2018/0315281 A1 Nov. 1, 2018

Related U.S. Application Data

(60) Provisional application No. 62/490,396, filed on Apr. 26, 2017.

(30) Foreign Application Priority Data

Jun. 28, 2017 (CN) .................... 2017 2 0762551 U (51) Int. Cl.
*G08B 13/196* (2006.01)
*H04N 7/18* (2006.01)
*F21S 8/08* (2006.01)
*H05B 37/02* (2006.01)
*H05B 33/08* (2006.01)
*F21V 33/00* (2006.01)
*F21K 9/232* (2016.01)
(Continued)

(52) U.S. Cl.
CPC ........ *G08B 13/19656* (2013.01); *F21K 9/232* (2016.08); *F21S 8/085* (2013.01); *F21V 33/0076* (2013.01); *G08B 13/19617* (2013.01); *H04N 7/18* (2013.01); *H04N 7/181* (2013.01); *H05B 33/0842* (2013.01); *H05B 37/0227* (2013.01); *G06K 9/00771* (2013.01); *G06K 9/2027* (2013.01); *H05B 37/0218* (2013.01)

(58) Field of Classification Search
CPC .......... H04N 7/181; H04N 7/185; H04N 5/77; H04N 7/188; H04N 5/33; H05B 37/0272; H05B 33/0845; G08B 13/1966
See application file for complete search history.

(56) References Cited

U.S. PATENT DOCUMENTS

2007/0052804 A1* 3/2007 Money .................... H04N 5/76 348/143
2009/0212198 A1* 8/2009 Anglikowski ...... F21V 23/0442 250/214 AL

(Continued)

*Primary Examiner* — Richard A Hansell, Jr.
(74) *Attorney, Agent, or Firm* — Locke Lord LLP; Tim Tingkang Xia, Esq.

(57) ABSTRACT

A surveillance and lighting system utilizing an existing electricity wiring for its power supply includes imaging and lighting devices and a network video recorder (NVR) wirelessly coupled with the imaging and lighting devices. Each imaging and lighting device has an imaging member operably in an on-state or an off-state; a lighting member operably in an on-state or an off-state; a microcontroller unit coupled with the imaging member and the lighting member for controlling operations of each of the imaging member and the lighting member in a respective state in accordance with an operation mode of said imaging and lighting device, and a power module coupled between the microcontroller unit and a standard AC power source for converting an AC power of the standard AC power source to at least one DC power.

20 Claims, 5 Drawing Sheets

(51) Int. Cl.
  *G06K 9/00*    (2006.01)
  *G06K 9/20*    (2006.01)

(56) References Cited

U.S. PATENT DOCUMENTS

| | | | |
|---|---|---|---|
| 2012/0044354 A1* | 2/2012 | Cheng | H04N 5/23203 |
| | | | 348/159 |
| 2014/0168618 A1* | 6/2014 | Kinebuchi | H04N 9/3185 |
| | | | 353/70 |
| 2014/0253664 A1* | 9/2014 | An | H04N 7/147 |
| | | | 348/14.02 |
| 2016/0261824 A1* | 9/2016 | Scalisi | H04N 7/142 |
| 2017/0134635 A1* | 5/2017 | Cho | H04W 76/14 |
| 2018/0035084 A1* | 2/2018 | Swiss | H04N 7/183 |
| 2018/0266672 A1* | 9/2018 | Gabriel | G08B 15/001 |

* cited by examiner

IMAGING AND LIGHTING DEVICE AND SURVEILLANCE AND LIGHTING SYSTEM HAVING SAME

CROSS-REFERENCE TO RELATED PATENT APPLICATIONS

This application claims priority to and the benefit of U.S. provisional patent application Ser. No. 62/490,396, filed Apr. 26, 2017, and Chinese patent application Serial No. 201720762551.0, filed Jun. 28, 2017, which are incorporated herein in their entireties by reference.

FIELD OF THE INVENTION

The present invention relates generally to security surveillance, and more particularly to an imaging and lighting device, and a security surveillance system having a plurality of imaging and lighting devices that uses standard light sockets of an existing electricity wiring system of premises for its power supply so as to free (or simplify) installation processes of the security surveillance system on the premises, such as residential houses, commercial buildings, traffic lighting systems and street lighting systems, and so on.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Security surveillance systems are popular among residential houses and commercial buildings for the purposes of surveillance. A security surveillance system typically includes a number of cameras for acquiring images of its surrounding to detect unusual incidents such as intrusions in the surrounding. Conventionally, the installation of the cameras need to install camera brackets on the exterior walls outside the house or building for accommodating the cameras and to wire electricity and data wires on the exterior walls to connect the cameras to a power box and a video recorder inside the house or building for power supply and video processing, respectively, which makes the installation process of the security surveillance system very complicated, and also time consuming and costly. The wired electricity/data wires on the exterior walls outside the house or building may make the appearance of the house or building less attractive. In addition, configurations of the conventional security surveillance system need to be performed after the installation.

Therefore, a heretofore unaddressed need exists in the art to address the aforementioned deficiencies and inadequacies.

SUMMARY OF THE INVENTION

One of the objectives of this invention is to provide an imaging and lighting device, and a security surveillance system having a plurality of imaging and lighting devices that use standard light sockets of an existing electricity wiring system of premises for its power supply so as to free (or simplify) installation processes of the security surveillance system on the premises, such as residential houses, commercial buildings, traffic lighting systems and street lighting systems, and so on. According to the invention, the installations of the imaging and lighting devices and the security surveillance system on the premises have no need to wire any electricity/data wires on the exterior walls outside the premises.

In one aspect, the invention relates to an imaging and lighting device. The imaging and lighting device is assembled in a single unit, and when in use, is received in a standard light socket of an existing electricity wiring system connected a standard AC power source for its power supply.

In one embodiment, the imaging and lighting device includes an imaging member operably in an on-state in which the imaging member acquires images of its surroundings and wirelessly transmitting the acquired images to a network video recorder (NVR), or an off-state in which the imaging member is tuned off, functioning as a security surveillance camera; a lighting member operably in an on-state in which the lighting member emits light to illuminate the surroundings, or an off-state in which the lighting member is turned off, functioning as standard household illumination light; and a microcontroller unit (MCU) coupled with the imaging member and the lighting member for controlling operations of each of the imaging member and the lighting member in a respective state in accordance with an operation mode of the imaging and lighting device, and a power module coupled between the MCU and the standard AC power source for converting an AC power of the standard 110V/220VAC power source to at least one DC power.

In one embodiment, the operation mode comprises one of a default operation mode in which the imaging member is operably in the on-state, and the lighting member is operably in the off-state; a manual operation mode in which the imaging member is operably in the on-state, and the state of the lighting member is operably determined by times of manually turning off and on of a switch during a time period, the switch being coupled between the power module/MCU and the standard AC power, and acting as a regular power switch and a code generator to the MCU via the AC power source off or on as well; and a remote operation mode in which the imaging member is operably in the on-state, and the state of the lighting member is operably determined by wirelessly transmitted signals in response to operations of a radio frequency (RF) remote control or executions of a mobile APP of a mobile device.

In one embodiment, the imaging and lighting device further includes an RF receiver coupled with the MCU for operably receiving the wirelessly transmitted signals emitted from the RF remote control in response to the operations of the RF remote control to operate the lighting member.

In one embodiment, the imaging and lighting device further includes a wireless networking module coupled with the MCU and the imaging member for operably receiving the wirelessly transmitted signals in response to the executions of the mobile APP of the mobile device, and transmitting the acquired images to the NVR.

In one embodiment, the imaging and lighting device further includes a thermal insulation member disposed between the imaging member and the lighting member.

In one embodiment, the imaging member comprises one or more cameras, one or more charge coupled devices (CCDs), one or more photosensors, or a combination of them. In one embodiment, the imaging member further comprises one or more infrared cameras, or one or more infrared sensors to acquire infrared images during a night time. In one embodiment, the lighting member comprises light-emitting diodes (LEDs).

In another aspect, the invention relates to a surveillance and lighting system that uses an existing electricity wiring system connected a standard AC power source for its power supply.

In one embodiment, the surveillance and lighting system includes a plurality of imaging and lighting devices, each imaging and lighting device being received in a standard light socket of the an existing electricity wiring system; and an NVR having a built-in wireless networking module (e.g., wireless router) coupled with the plurality of imaging and lighting devices through wireless local area networking. The NVR is connected to the Internet.

In one embodiment, each imaging and lighting device is assembled in a single unit, and includes an imaging member operably in an on-state in which the imaging member acquires images of its surroundings and wirelessly transmitting the acquired images to the NVR all the time when a DC power is provided to the MCU as the switch is on, or an off-state in which the imaging member is tuned off; a lighting member operably in an on-state in which the lighting member emits light to illuminate the surroundings, or an off-state in which the lighting member is turned off; and an MCU coupled with the imaging member and the lighting member for controlling operations of each of the imaging member and the lighting member in a respective state in accordance with an operation mode of said imaging and lighting device, and a power module coupled between the MCU and the standard AC power source for converting an AC power of the standard 110/220V AC power source to at least one DC power.

In one embodiment, the imaging member comprises one or more cameras, one or more CCDs, one or more photosensors, or a combination of them. In one embodiment, the imaging member further comprises one or more infrared cameras, or one or more infrared sensors to acquire infrared images during a night time. In one embodiment, the lighting member comprises LEDs.

In one embodiment, the NVR is configured to record and process the acquired images/video by each imaging and lighting device in real time, and save the acquired images/video on its internal memory media (e.g., hard drive, SD card, and so on) locally onsite, and/or provide internet remote viewing and playback, and send an alert to one or more client terminals when an unusual incident is identified in the acquired images.

In one embodiment, the operation mode comprises one of a default operation mode in which the imaging member is operably in the on-state, and the lighting member is operably in the off-state; a manual operation mode in which the imaging member is operably in the on-state, and the state of the lighting member is operably determined by times of manually turning off and on of a switch during a time period, the switch being coupled between the power module/MCU and the standard AC power source, and acting as a regular power switch and a code generator to the MCU via the AC power source off or on as well; and a remote operation mode in which the imaging member is operably in the on-state, and the state of the lighting member is operably determined by wirelessly transmitted signals in response to operations of a radio frequency (RF) remote control or executions of a mobile APP of a mobile device In one embodiment, each imaging and lighting device further comprises an RF receiver coupled with the MCU for operably receiving the wirelessly transmitted signals emitted from the RF remote control in response to the operations of the RF remote control.

In one embodiment, each imaging and lighting device further comprises a wireless networking module coupled with the MCU and the imaging member for operably receiving the wirelessly transmitted signals in response to the executions of the mobile APP of the mobile device, and transmitting the acquired images to the NVR.

In one embodiment, the wireless networking module of each imaging and lighting device is pre-paired in the factory with the wireless networking module (e.g., a built-in Wi-Fi® router) of the NVR such that when the surveillance and lighting system is installed and powered on, the wireless networking module of each imaging and lighting device and the wireless networking module of the NVR can communicates with each other through the wireless local area networking immediately.

In one embodiment, each imaging and lighting device further comprises a thermal insulation member disposed between the imaging member and the lighting member.

In one embodiment, the RF remote control is configured to control operations of each of the plurality of imaging and lighting devices individually or coordinately.

In one embodiment, the mobile APP is configured to control operations of each of the plurality of imaging and lighting devices individually or coordinately.

These and other aspects of the present invention will become apparent from the following description of the preferred embodiments taken in conjunction with the following drawings, although variations and modifications thereof may be affected without departing from the spirit and scope of the novel concepts of the invention.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment.

DETAILED DESCRIPTION OF THE INVENTION

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term are the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third, etc. may be used herein to describe various elements, components, regions and/or sections, these elements, components, regions and/or sections should not be limited by these terms. These terms are only used to distinguish one element, component, region, layer or section from another element, component, region, layer or section. Thus, a first element, component, region, or section discussed below could be termed a second element, component, region, or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, the terms "comprise" or "comprising", "include" or "including", "carry" or "carrying", "has/have" or "having", "contain" or "containing", "involve" or "involving" and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "central processing unit", or its acronym "CPU", refers to one or more processors, more specifically to its processing unit and control unit within a computer or a control apparatus that carries out the instructions of a computer program by performing the basic arithmetic, logical, control and input/output (I/O) operations specified by the instructions.

The terms "chip" or "computer chip", as used herein, generally refer to a hardware electronic component, and may refer to or include a small electronic circuit unit, also known as an integrated circuit (IC), or a combination of electronic circuits or ICs.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

As used herein, the term "microcontroller unit" and its acronym "MCU", is a small computer on a single integrated circuit (IC) chip that can execute programs for controlling other devices or machines. A microcontroller unit contains one or more CPUs (processor cores) along with memory and programmable input/output (I/O) peripherals, and is usually designed for embedded applications.

As used herein, the term "server" generally refers to a system that responds to requests across a computer network to provide, or help to provide, a network service. An implementation of the server may include software and suitable computer hardware. A server may run on a computing device or a network computer. In some cases, a computer may provide several services and have multiple servers running.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The description is now made as to the embodiments of the invention in conjunction with the accompanying drawings. In accordance with the purposes of this invention, as embodied and broadly described herein, this invention, in one aspect, relates to an imaging and lighting device, and a security surveillance system having a plurality of imaging and lighting devices that use standard light sockets of an existing electricity wiring system of premises for its power supply so as to free (or simplify) installation processes of the security surveillance system on the premises, such as residential houses, commercial buildings, traffic lighting systems and street lighting systems, and so on.

Figure 1:
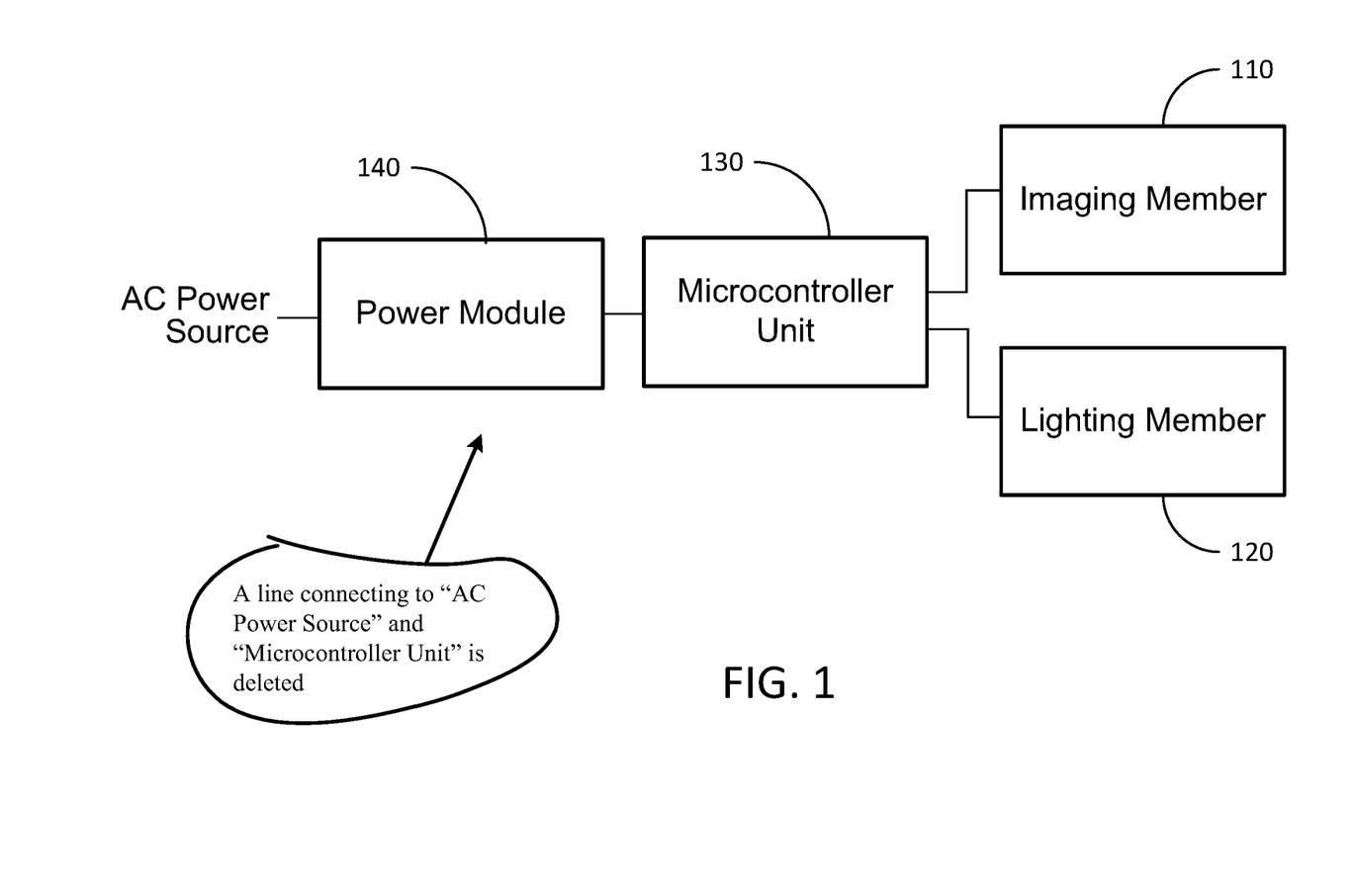
FIG. 1 shows schematically an imaging and lighting device according to one embodiment of the present invention.

Referring to FIG. 1, an imaging and lighting device is schematically shown according to one embodiment of the invention. In the exemplary embodiment, the imaging and lighting device includes an imaging member 110, a lighting member 120, a microcontroller unit (MCU) 130, and a power module 140. When in use, the imaging and lighting device is received in a standard light socket of an existing electricity wiring system of a premises connected a standard AC power source for its power supply. The standard light socket can be an E26 Edison socket, an E27 Edison socket, a B22 Bayonet socket, or the likes. Depending upon where the imaging and lighting device is used, the standard AC power source may refer to, for example, an AC power having a voltage of about 110 volts at a frequency of about 60 Hz in the North American standard, or an AC power having a voltage of about 220 volts at a frequency of about 50 Hz in the European standard.

The imaging member 110 is operably in an on-state in which the imaging member is turned on and acquires images of its surroundings and wirelessly transmitting the acquired images to a network video recorder (NVR), or an off-state in which the imaging member is tuned off and no images will be acquired by the imaging member 110. In certain embodiments, the imaging member 110 includes, but is not limited to, one or more cameras, one or more charge coupled devices (CCDs), one or more photosensors, or a combination of them or any types of imaging means. In certain embodiments, the imaging member 110 may further comprise one or more infrared cameras, or one or more infrared sensors to acquire infrared images during a night time.

The lighting member 120 is operably in an on-state in which the lighting member 120 is turned on and emits light to illuminate the surroundings, or an off-state in which the lighting member is turned off and emits no light. In one embodiment, the lighting member 120 includes, but is not limited to, light-emitting diodes (LEDs), or any other lighting devices.

The microcontroller unit (MCU) 130 is coupled with the imaging member 110 and the lighting member 120 and is configured to control operations of each of the imaging member 110 and the lighting member 120 in a respective state in accordance with an operation mode of the imaging and lighting device.

The power module 140 coupled between the MCU 130 and the standard AC power source. The power module 140 may include resistors, capacitors, inductors, rectifying diodes, Zener diodes, and transformers for converting an AC power, e.g., 110V at 60 Hz, of the standard AC power source to at least one DC power, e.g., 4V, 5V, 6V, 12V, 24V, and so on. Those of skill in the art will appreciate the wide variety of power modules and configurations available.

In one embodiment, the operation mode is a default operation mode, a manual operation mode, or a remote operation mode. Since the imaging and lighting device is primarily used in a security surveillance system, the imaging member 110 is normally set in the on-state in all the operation modes, so as to enable the imaging member 110 to acquire the images of its surroundings in 24 hours a day and 7 days a week for the purpose of surveillance. It should be appreciated by those of skill in the art that the imaging member 110 can also be operated in the off-state depending on need.

When the imaging and lighting device operates in the default operation mode, the imaging member 110 is operably in the on-state, while the lighting member 120 is operably in the off-state.

When the imaging and lighting device operates in the manual operation mode, the imaging member 110 is operably in the on-state all the time when a DC power is provided to the MCU 130 as the switch is on, while the state of the lighting member 120 is operably determined by times of manually turning on and off of a switch during a time period, where the switch is coupled between the power module 140 and the MCU 130 and the standard AC power source (e.g., through an electrical power breaker box of the existing electricity wiring system). The switch is normally switched on so as to ensure the imaging member 110 is powered on in the on-state. Usually, the MCU 130 is configured to set the lighting member 120 in the off-state as default. In certain embodiments, if a user manually turns the switch off and on one or more times during a time period interval, e.g., 4 seconds interval per cycle, the MCU 130 sets the lighting member 120 in the on-state. In certain embodiments, if the user manually turns off the switch for more than a predefined time, e.g., 5 seconds, and then turns it on back, the MCU 130 resets itself and the imaging and lighting device will operate in the default operation mode, the imaging member is operably in the on-state, and the lighting member is operably in the off-state.

When the imaging and lighting device operates in the remote operation mode, the imaging member 110 is operably in the on-state, while the state of the lighting member 120 is operably determined by wirelessly transmitted signals in response to operations of a radio frequency (RF) remote control or executions of a mobile APP of a mobile device. In the embodiment, the MCU 130 may include a RF receiver and/or a wireless networking transceiver for receiving the wirelessly transmitted signals.

In one embodiment, a user can operate the RF remote control to set the lighting member 120 in the on-state or in the off-state. For example, pressing an ON button of the RF remote control turns the lighting member 120 in the on-state, and pressing an OFF button of the RF remote control turns the lighting member 120 in the off-state. Similarly, the user can also set the lighting member 120 in the on-state or in the off-state though the mobile APP installed in the mobile device.

Figure 2:
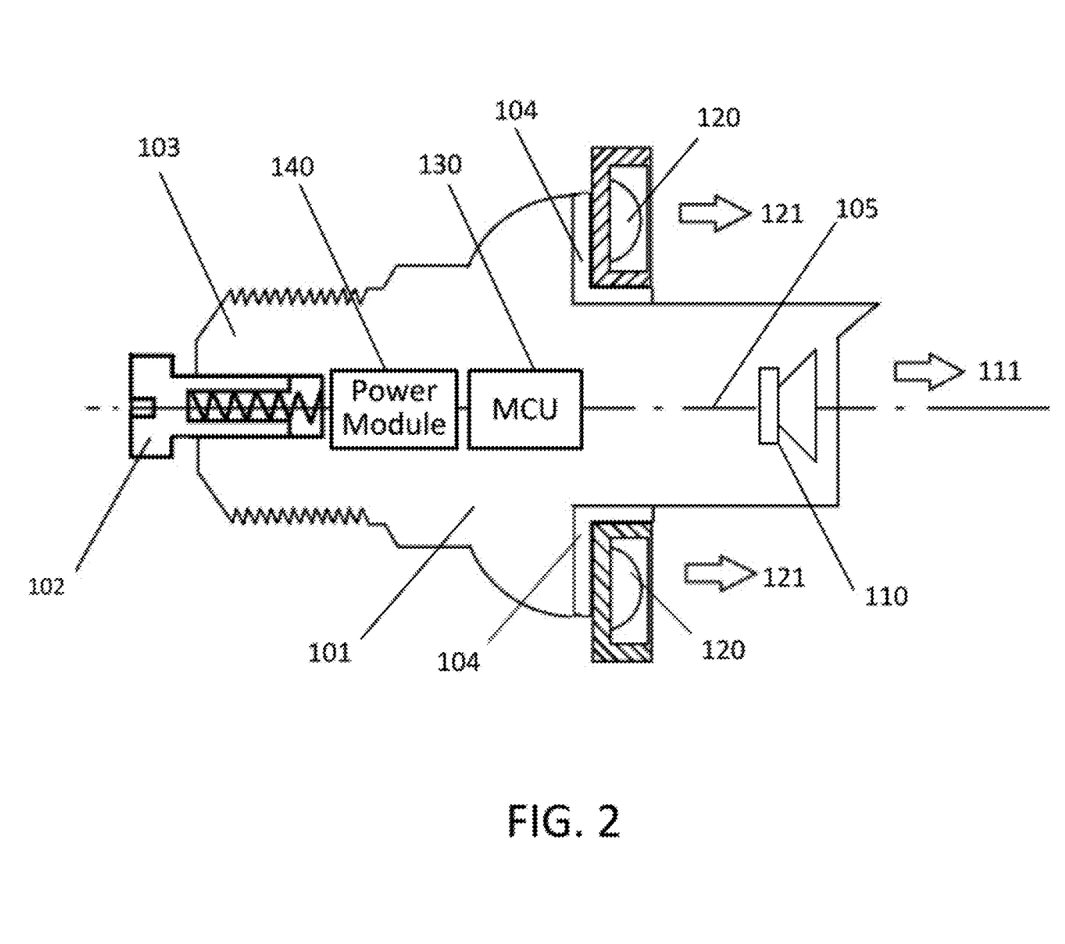
FIG. 2 shows schematically an imaging and lighting device according to one embodiment of the present invention.
Figure 3:
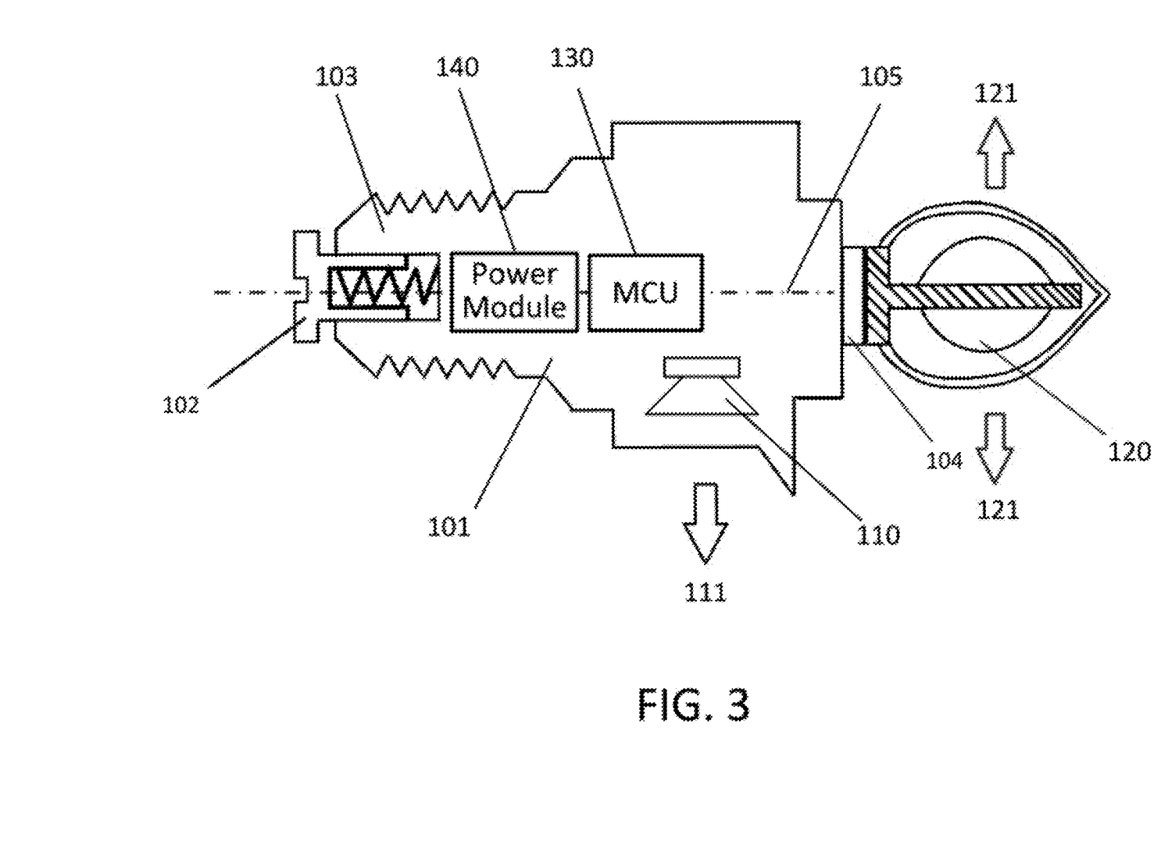
FIG. 3 shows schematically an imaging and lighting device according to one embodiment of the present invention.

According to embodiments of the invention, the imaging and lighting device is assembled in a single unit, as shown in FIGS. 2 and 3. The imaging and lighting device has a connection portion 103 adapted to connect the imaging and lighting device to a standard light socket of an existing electricity wiring system for its power supply, and a housing 101 extending from the connection portion 103 for accommodating the power module 140, the MCU 130, the imaging member 110 and the lighting member 120. In the exemplary embodiments, the imaging and lighting device also includes a thermal insulation member 104 disposed between the imaging member 110 and the lighting member 120 to reduce the heat transfer from the light member 120 including the LEDs to the imaging member 110. The imaging and lighting device also includes an adjustable bottom contact point 102 to ensure that when the imaging and lighting device is received in a standard light socket of the existing electricity wiring system, the imaging member 110 is adjusted to a normal view. In addition, the LEDs can be detachably attached to the lighting member 120, which makes upgrade and maintenance of the LED lighting member 120 easier.

In the embodiment shown in FIG. 2, the imaging member 110 is disposed along a central axis 105 of the imaging and lighting device, while the lighting member 120 surrounds the imaging member 110, such that the field of view 111 of the imaging member 110 and the illumination 121 of the lighting member 120 are in the same direction that is along the axis 105. However, in the embodiment shown in FIG. 3, the imaging member 110 and the lighting member 120 are stacked along a central axis 105 of the imaging and lighting device, such that the field of view 111 of the imaging member 110 and the illumination 121 of the lighting member 120 are perpendicular to the axis 105, which are along the radial directions. It should be appreciated by those of skill in the art that other arrangements of the imaging member 110 and the lighting member 120 can also be utilized to practice the invention.

Figure 4:
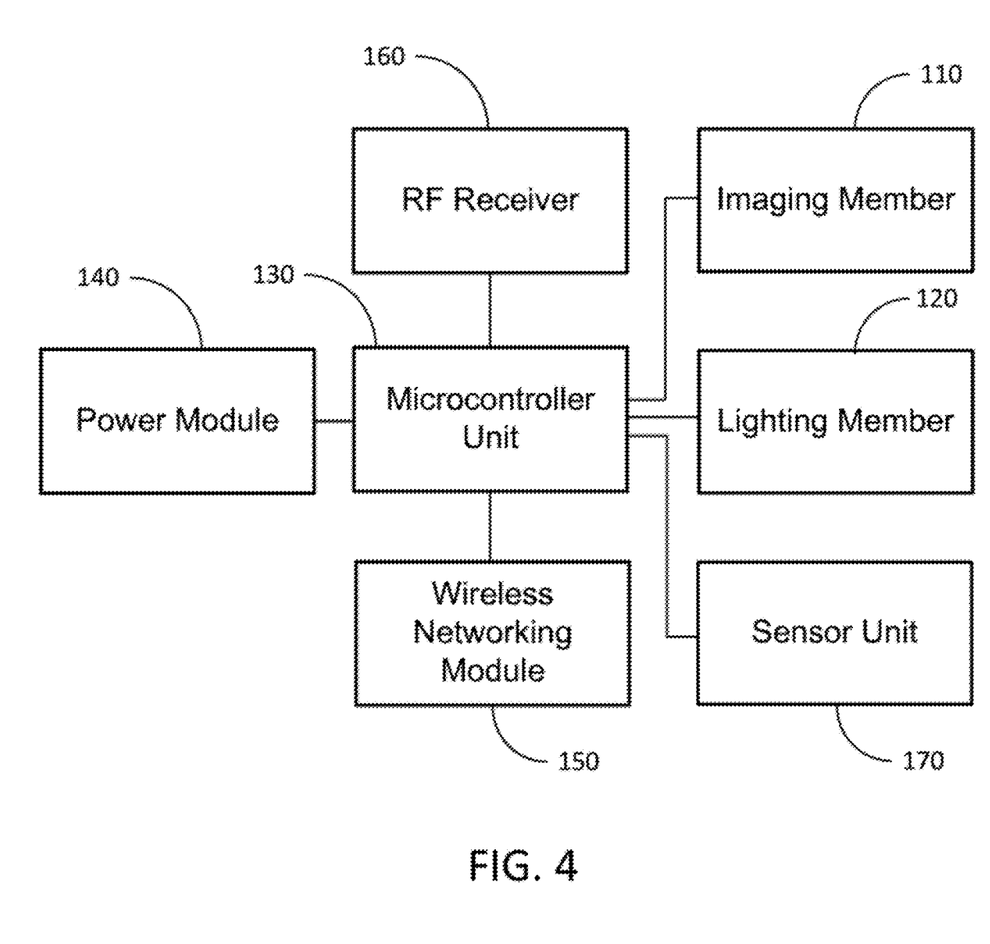
FIG. 4 shows schematically an imaging and lighting device according to one embodiment of the present invention.

Referring to FIG. 4, the imaging and lighting device is schematically shown according to one embodiment of the invention. In the exemplary embodiment, the imaging and lighting device may also include an RF receiver 160 coupled with the MCU 130 for operably receiving the wirelessly transmitted signals emitted from the RF remote control in response to the operations of the RF remote control, and a wireless networking module 150 coupled with the MCU 130 and the imaging member 110 for operably receiving the wirelessly transmitted signals in response to the executions of the mobile APP of the mobile device, and transmitting the acquired images to the NVR. The wireless networking module may include a Wi-Fi® transceiver. The mobile device can be a smartphone, a tablet, a smartwatch, a PDA (personal digital assistant), a laptop, or the likes.

Furthermore, as shown in FIG. 4, the imaging and lighting device may include a sensor unit 170 coupled to the MCU 130. The sensor unit 170 may have one more motion sensors for detecting movement events of the surrounding, so as to activate the image member 110 and/or the lighting member 120. The sensor unit 170 may have one more Photosensors/PIR sensors for detecting an ambient light/IR level of the surrounding.

Moreover, the imaging and lighting device may also include means for generating electricity from solar, e.g., one or more solar panels.

Figure 5:
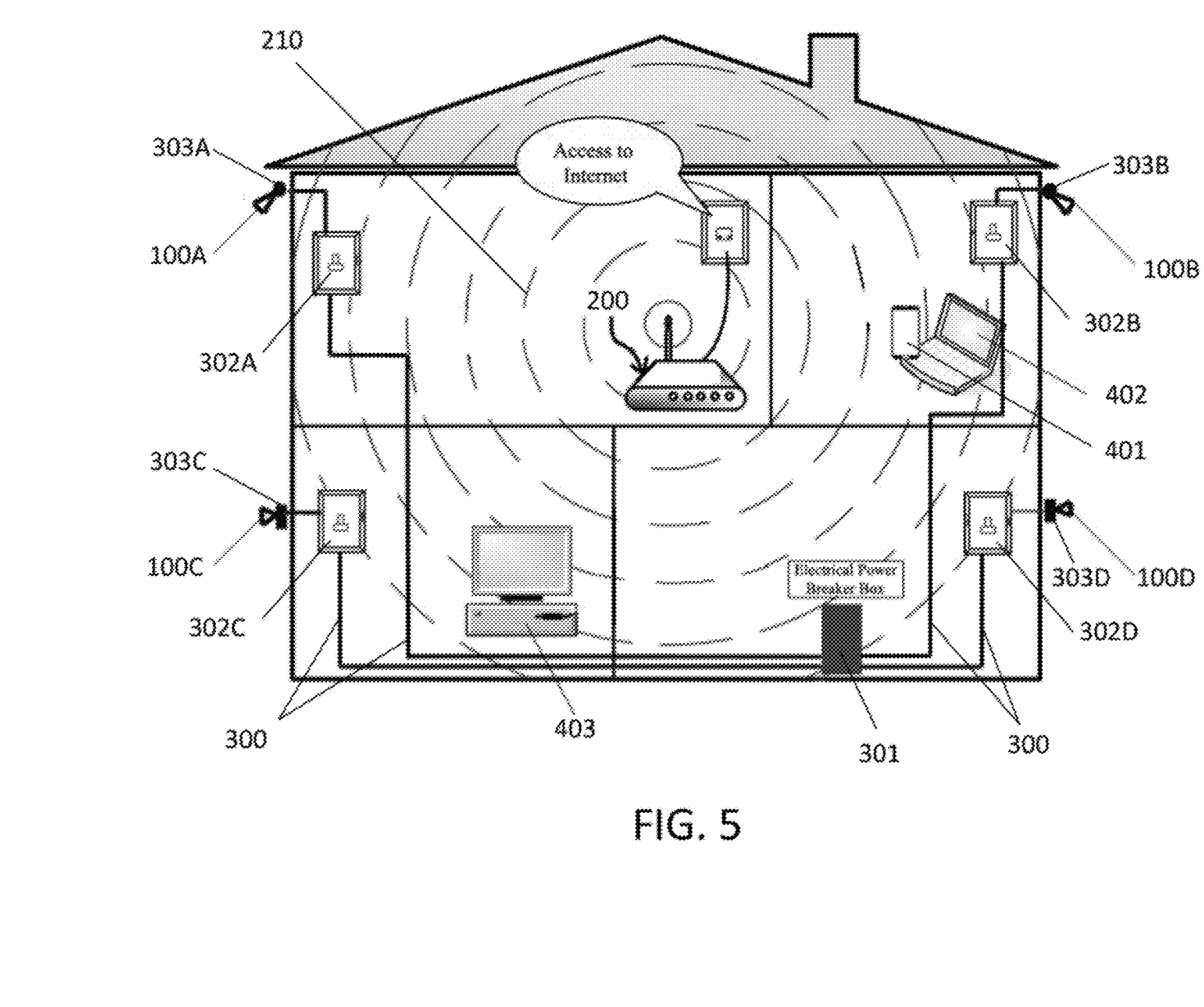
FIG. 5 shows schematically a surveillance and lighting system according to one embodiment of the present invention.

FIG. 5 shows schematically a surveillance and lighting system according to one embodiment of the invention. The surveillance and lighting system utilizes the existing home electricity wiring system 300 for the power supply, without any wiring modification or wiring installation. The existing home electricity wiring system 300 includes, but is not limited to, an electrical power breaker box 301 being directly connected to the AC power source, switches 302A, 302B, 302C and 302D, flood light sockets 303A and 303B, door light sockets 303C and 303D. Each of the flood light sockets 303A and 303B and the door light sockets 303C and 303D is connected to the electrical power breaker box 301 through a corresponding switch 302A, 302B, 302C or 302D. Each switch 302A, 302B, 302C or 302D is pre-installed on walls inside the house for switching the power supply on or off for the corresponding the light sockets 303A, 303B, 303C or 303D.

In the exemplary embodiment shown in FIG. 5, the surveillance and lighting system has four imaging and lighting devices 100A, 100B, 100C and 100D, each of which is in a single unit and placed in a standard light socket of the existing electricity wiring system 300. The imaging and lighting devices 100A and 100B are placed in the flood light sockets 303A and 303B, respectively, while the imaging and lighting devices 100C and 100D are placed in the door light sockets 303C and 303D, respectively. Each of the imaging and lighting devices 100A, 100B, 100C and 100D is disclosed as above. It should be appreciated by those of skill in the art that other arrangements of other numbers of the imaging and lighting devices can also be utilized to practice the invention.

In certain embodiments, the operations of each imaging and lighting device is controlled by its MCU. The operation mode of each imaging and lighting device includes, but is not limited to, a default operation mode, a manual operation mode, or a remote operation mode. Since one of the purposes of the system is for surveillance, for each imaging and lighting device the imaging member is normally set in the on-state in all the operation modes, so as to enable the imaging member to acquire the images of its surroundings in 24 hours a day and 7 days a week for the purpose of surveillance. It should be appreciated by those of skill in the art that the imaging member can also be operated in the off-state depending on need.

When the imaging and lighting device operates in the default operation mode, the imaging member is operably in the on-state, and the lighting member is operably in the off-state.

When the imaging and lighting device operates in the manual operation mode, the imaging member is operably in the on-state all the time when a DC power is delivered to the MCU as the switch is on, while the state of the lighting member is operably determined by times of manually turning off and on of a switch during a time period, where the switch is coupled between the power module/MCU and the standard AC power source. The switch is normally switched on so as to ensure the imaging member is powered on in the on-state. Usually, the MCU is configured to set the lighting member in the off-state. In certain embodiments, In certain embodiments, if a user manually turns the switch off and on one or more times during a time period interval, e.g., 4 seconds interval per cycle, the MCU 130 sets the lighting member 120 in the on-state. In certain embodiments, if the user manually turns off the switch for more than a predefined time, e.g., 5 seconds, and then turns it on back, the MCU 130 resets itself and the imaging and lighting device will operate in the default operation mode, the imaging member is operably in the on-state, and the lighting member is operably in the off-state.

When the imaging and lighting device operates in the remote operation mode, the imaging member is operably in the on-state, while the state of the lighting member is operably determined by wirelessly transmitted signals in response to operations of a RF remote control or executions of a mobile APP of a mobile device 401 or 402.

In one embodiment, a user can operate the RF remote control to set the lighting member of each imaging and lighting device individually or coordinately in the on-state or in the off-state. For example, the user can select one or more imaging and lighting devices to be controlled, pressing an ON button of the RF remote control turns the lighting member of the selected imaging and lighting devices in the on-state, and pressing an OFF button of the RF remote control turns the lighting member of the selected imaging and lighting devices in the off-state. Similarly, the user can also set the lighting member of each imaging and lighting device individually or coordinately in the on-state or in the off-state though the mobile APP installed in the mobile device 401 or 402.

In addition, the operations of the imaging and lighting devices may also be triggered by certain events/incidents, for example, but are not limited to, a movement, smoking, explosion and so on, in the surrounding of the house.

The surveillance and lighting system also includes an NVR 200. In one embodiment, the NVR 200 is connected to the Internet through an Ethernet connection. The NVR 200 is configured to record and process the acquired images by each imaging and lighting device in real time and send an alert to one or more client terminals, e.g., a smartphone 401, and/or a laptop 402, when an unusual incident is identified in the acquired images. Additionally, the acquired images are stored in internal memory media (e.g., HDD, SD card, and so on) of the NVR locally onsite. Furthermore, the acquired images may be stored in a cloud server, a database server, and/or a computer 403.

According to embodiments of the invention, the NVR has a built-in wireless networking module (e.g., a Wi-Fi® router) and coupled with the imaging and lighting devices 100A-100D through wireless local area networking 210. As disclosed above, each imaging and lighting device also has a wireless networking module coupled with the MCU and the imaging member for operably receiving the wirelessly transmitted signals in response to the executions of the mobile APP of the mobile device, and transmitting the acquired images to the NVR 200. The wireless networking module of each imaging and lighting device is pre-paired in the factory with the wireless networking module of the NVR 200, for example, through the Wi-Fi® networking protocol, such that when the surveillance and lighting system is installed and powered on, the wireless networking module of each imaging and lighting device and the wireless networking module of the NVR 200 can communicates with each other through the wireless local area networking immediately. Accordingly, no additional networking configurations and programs are needed.

By replacing the conventional door/flood lights with the invented imaging and lighting devices which have an imaging member, e.g., Wi-Fi® HD cameras, built in, and connected to the associated Wi-Fi® NVR 200 inside the house, the imaging member, e.g., Wi-Fi® HD cameras, of the imaging and lighting device starts to acquire the image of the surrounding and send the video stream via the Wi-Fi® network to the NVR 200, the security surveillance coverage can be immediately established on the entire house. The NVR 200 records the video on its in internal memory media, processes it and sends alerts to the mobile device when an unusual incident is identified in the acquired images/video through the Internet. This configuration totally eliminates the requirement for security surveillance camera wiring. All of the cameras of the system get their power from the existing house electricity wiring system and sends videos via the Wi-Fi® network to the NVR.

In certain embodiments, the NVR may have 4, 8, 16, 32 channels available and internal memory including a hard drive or a SD card. The wireless RF remote control for operating light member and may have a Wi-Fi® range extender to enhance the WiFi® signal strength for the cameras' connectivity. The built-in internal router of the Wi-Fi® NVR is preconfigured to recognize any same family's cameras which are in its WiFi® range. Accordingly, the user does not need to perform any configuration to setup the cameras. In addition, the NVR may have P2P capability, which saves the requirement to configure the NVR on user's home network. The user just needs to connect the NVR to home network router via the Cat5e cable which allows the internet remote view and mobile alert functions to be instantly established. The entire surveillance and lighting system can achieve 100% plug and play. This system simplifies the complicated home security camera system installation process to replace the "light bulbs" and turn on the NVR.

In addition, the operations of the surveillance and lighting system are very easy. For example, after plugging the imaging and lighting devices 100A, 100B, 100C and 100D into the flood light sockets 303A and 303B and the door light sockets 303C and 303D, respectively, turning on the corresponding switch 302A, 302B, 302C and 302D will start the surveillance and lighting system which operates in the default operation mode, where the imaging member of each imaging and lighting device is operably in the on-state, and the lighting member of each imaging and lighting device is operably in the off-state.

A user can change them from the default operation mode to the manual operation mode or the remote operation mode anytime. For example, during the day or night time, if the user would like to turn the lighting member of an imaging and lighting device in the on-state, the user can manually turns the corresponding switch off and on one or more times during a time period interval, e.g., 4 seconds interval per cycle, said lighting member will be set in the on-state; If the user would like to turn the lighting member of an imaging and lighting device in the off-state, the user can manually turns off the corresponding switch for more than a predefined time, e.g., 5 seconds, and then turns it on back, the MCU 130 resets itself and the imaging and lighting device will operate in the default operation mode, the imaging member is operably in the on-state, and the lighting member is operably in the off-state, said lighting member will be set in the off-state.

To change them from the default operation mode or the manual operation mode to the remote operation mode, the user can select one or more imaging and lighting devices to be controlled, pressing an ON button of the RF remote control turns the lighting member of the selected imaging and lighting devices in the on-state, and pressing an OFF button of the RF remote control turns the lighting member of the selected imaging and lighting devices in the off-state. Similarly, the user can also set the lighting member of each imaging and lighting device individually or coordinately in the on-state or in the off-state though the mobile APP installed in the mobile device 401 or 402.

According to the invention, the surveillance and lighting system can be employed for surveillance and lighting of residential houses, office buildings, shops, streets, and the others. Furthermore, the imaging and lighting devices and the surveillance and lighting system can be installed by plugging them in the existing electricity wire system without need to wire any electricity/data wires on the exterior walls outside the premises.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope as is discussed and set forth above and below including claims and drawings. Furthermore, the embodiments described above and claims set forth below are only intended to illustrate the principles of the present invention and are not intended to limit the scope of the invention to the disclosed elements. Accordingly, the scope of the present invention is defined by the appended claims rather than the foregoing description and the exemplary embodiments described therein.

What is claimed is:

1. An imaging and lighting device, comprising: an imaging member operably in an on-state in which the imaging member acquires images of its surroundings and wirelessly transmitting the acquired images to a network video recorder (NVR), or an off-state in which the imaging member is tuned off, a lighting member operably in an on-state in which the lighting member emits light to illuminate the surroundings, or an off-state in which the lighting member is turned off, a microcontroller unit (MCU) coupled with the imaging member and the lighting member for controlling operations of each of the imaging member and the lighting member in a respective state in accordance with an operation mode of the imaging and lighting device; and a power module coupled between the MCU and a standard AC power source for converting an AC power of the standard AC power source to at least one DC power, wherein the power module is electrically connected to the standard AC power source through a switch that acts as a regular power switch and a code generator to the MCU via the number of times of which the switch turns the standard AC power source off or on in a given time period interval, wherein the imaging and lighting device is assembled in a single unit and received in a standard light socket of an existing electricity wiring system connected to the standard AC power source for its power supply when in use; and wherein the operation mode comprises a default operation mode or a manual operation mode, wherein the MCU is configured to set the imaging member in the on-state in the default and manual operation modes, and to set the lighting member from the off-state in the default operation mode to the on-state in the manual operation mode by manually turning the switch off and on alternately one or more times during the time period interval, or to set the lighting member from the on-state in the manual operation mode to the off-state in the default operation mode by manually turning off the switch for a predefined time and subsequently turning the switch on, and wherein the predefined time is longer than the time period interval.

2. The imaging and lighting device of claim 1, wherein the operation mode further comprises:
a remote operation mode in which the imaging member is operably in the on-state, and the state of the lighting member is operably determined by wirelessly transmitted signals in response to operations of a radio frequency (RF) remote control or executions of a mobile APP of a mobile device.

3. The imaging and lighting device of claim 1, further comprising an RF receiver coupled with the MCU for operably receiving the wirelessly transmitted signals emitted from the RF remote control in response to the operations of the RF remote control.

4. The imaging and lighting device of claim 1, further comprising a wireless networking module coupled with the MCU and the imaging member for operably receiving the wirelessly transmitted signals in response to the executions of the mobile APP of the mobile device, and transmitting the acquired images to the NVR.

5. The imaging and lighting device of claim 1, further comprising a thermal insulation member disposed between the imaging member and the lighting member.

6. The imaging and lighting device of claim 1, wherein the imaging member comprises one or more cameras, one or more charge coupled devices (CCDs), one or more photosensors, or a combination of them.

7. The imaging and lighting device of claim 6, wherein the imaging member further comprises one or more infrared cameras, or one or more infrared sensors to acquire infrared images during a night time.

8. The imaging and lighting device of claim 1, wherein the lighting member comprises light-emitting diodes (LEDs).

9. A surveillance and lighting system that uses an existing electricity wiring system connected to a standard AC power source for its power supply, comprising: a plurality of imaging and lighting devices, each imaging and lighting device being received in a standard light socket of the an existing electricity wiring system; and a network video recorder (NVR) having a wireless networking module coupled with the plurality of imaging and lighting devices through wireless local area networking, the NVR being connected to the Internet, wherein each imaging and lighting device is assembled in a single unit and comprises: an imaging member operably in an on-state in which the imaging member acquires images of its surroundings and wirelessly transmitting the acquired images to the NVR, or an off-state in which the imaging member is tuned off, a lighting member operably in an on-state in which the lighting member emits light to illuminate the surroundings, or an off-state in which the lighting member is turned off; a microcontroller unit (MCU) coupled with the imaging member and the lighting member for controlling operations of each of the imaging member and the lighting member in a respective state in accordance with an operation mode of said imaging and lighting device; and a power module coupled between the MCU and a standard AC power source for converting an AC power of the standard AC power source to at least one DC power, wherein the power module is electrically connected to the standard AC power source through a switch that acts as a regular power switch and a code generator to the MCU via the number of times of which the switch turns the standard AC power source off or on in a given time period interval, wherein the operation mode of said imaging and lighting device comprises a default operation mode or a manual operation mode, wherein the MCU is configured to set the imaging member of said imaging and lighting device in the on-state in the default and manual operation modes, and to set the lighting member of said imaging and lighting device from the off-state in the default operation mode to the on-state in the manual operation mode by manually turning the switch off and on alternately one or more times during the time period interval, or to set the lighting member of said imaging and lighting device from the on-state in the manual operation mode to the off-state in the default operation mode by manually turning off the switch for a predefined time and subsequently turning the switch on, and wherein the predefined time is longer than the time period interval.

10. The surveillance and lighting system of claim 9, wherein the operation mode further comprises:
   a remote operation mode in which the imaging member is operably in the on-state, and the state of the lighting member is operably determined by wirelessly transmitted signals in response to operations of a radio frequency (RF) remote control or executions of a mobile APP of a mobile device.

11. The surveillance and lighting system of claim 9, wherein each imaging and lighting device further comprises an RF receiver coupled with the MCU for operably receiving the wirelessly transmitted signals emitted from the RF remote control in response to the operations of the RF remote control.

12. The surveillance and lighting system of claim 9, wherein each imaging and lighting device further comprises a wireless networking module coupled with the MCU and the imaging member for operably receiving the wirelessly transmitted signals in response to the executions of the mobile APP of the mobile device, and transmitting the acquired images to the NVR.

13. The surveillance and lighting system of claim 12, wherein the wireless networking module of each imaging and lighting device is pre-paired with the wireless networking module of the NVR such that when the surveillance and lighting system is installed and powered on, the wireless networking module of each imaging and lighting device and the wireless networking module of the NVR communicates immediately with each other through wireless local area networking.

14. The surveillance and lighting system of claim 10, wherein the RF remote control is configured to control operations of each of the plurality of imaging and lighting devices individually or coordinately.

15. The surveillance and lighting system of claim 10, wherein the mobile APP is configured to control operations of each of the plurality of imaging and lighting devices individually or coordinately.

16. The surveillance and lighting system of claim 9, wherein each imaging and lighting device further comprises a thermal insulation member disposed between the imaging member and the lighting member.

17. The surveillance and lighting system of claim 9, wherein the imaging member comprises one or more cameras, one or more charge coupled devices (CCDs), one or more photosensors, or a combination of them.

18. The surveillance and lighting system of claim 17, wherein the imaging member further comprises one or more infrared cameras, or one or more infrared sensors to acquire infrared images during a night time.

19. The surveillance and lighting system of claim 9, wherein the lighting member comprises light-emitting diodes (LEDs).

20. The surveillance and lighting system of claim 9, wherein the NVR is configured to record and process the acquired images by each imaging and lighting device in real time and send an alert to one or more client terminals when an unusual incident is identified in the acquired images and provide remote viewing and playback.

* * * * *